(12) United States Patent
Wolfe

(10) Patent No.: US 6,585,911 B2
(45) Date of Patent: Jul. 1, 2003

(54) METHOD OF MAKING A BORATE PHOSPHOR HAVING A DISCRETE PARTICLE MORPHOLOGY

(75) Inventor: Robert W. Wolfe, Towanda, PA (US)

(73) Assignee: Osram Sylvania Inc., Danvers, MA (US)

( * ) Notice: Subject to any disclaimer, the term of this patent is extended or adjusted under 35 U.S.C. 154(b) by 150 days.

(21) Appl. No.: 09/829,544

(22) Filed: Apr. 10, 2001

(65) Prior Publication Data

US 2001/0040231 A1 Nov. 15, 2001

Related U.S. Application Data

(60) Provisional application No. 60/198,707, filed on Apr. 20, 2000.

(51) Int. Cl.⁷ .......................... C09K 11/63; C09K 11/77
(52) U.S. Cl. ................................. 252/301.4 R
(58) Field of Search ................... 252/301.4 R

(56) References Cited

U.S. PATENT DOCUMENTS 4,883,970 A * 11/1989 Page ....................... 250/483.1

FOREIGN PATENT DOCUMENTS

WO    WO 99/38186    7/1999 ............ H01J/29/20

OTHER PUBLICATIONS

Kottaisamy et al., On the Formation of Flux Grown $Y_2O_2S$: $Eu^{3+}$ Red Phosphor, *J. Electrochem. Soc.*, 142 (9) (1995) 3205–3209.

Koike et al., New Tricolor Phosphors for Gas Discharge Display, *J. Electrochem. Soc.: Solid–State Science and Technology*, 126 (6) (1979) 1008–1010.

Justel et al., Improved VUV Phosphors for Plasma Display Panels, *Electrochemical Society Proceeding*, 98–24 (1998) 103–119.

Avella et al., Rare Earth Cathodoluminescence in $InBO_3$ and Related Orthoborates, *J. Electrochem. Soc.: Solid State Science*, 114 (6) (1967) 613–616.

* cited by examiner

*Primary Examiner*—C. Melissa Koslow
(74) *Attorney, Agent, or Firm*—Robert F. Clark

(57) ABSTRACT

A flux is described for making borate phosphors with a discrete particle morphology. The flux is comprised of a salt of barium, sodium, potassium, or a combination thereof. The discrete particle morphology permits the borate phosphors to be used directly without deagglomeration.

18 Claims, 4 Drawing Sheets

Fig. 1 - Prior Art
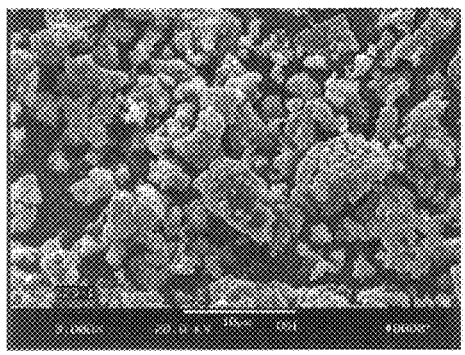
Fig. 4
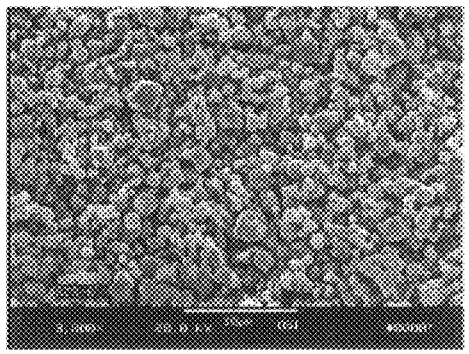
Fig. 2
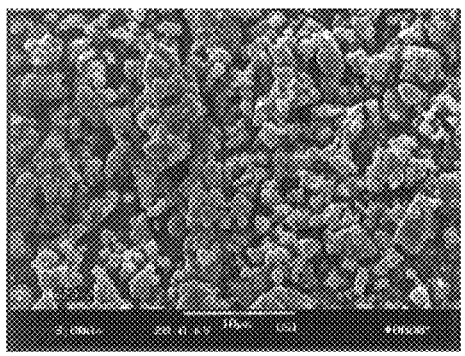
Fig. 5
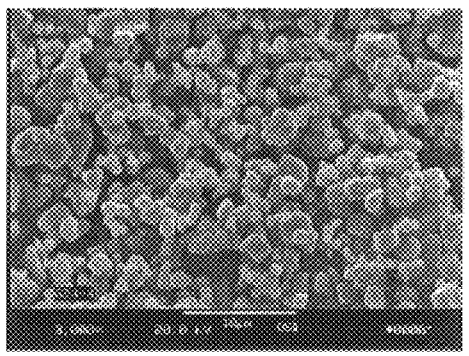
Fig. 3
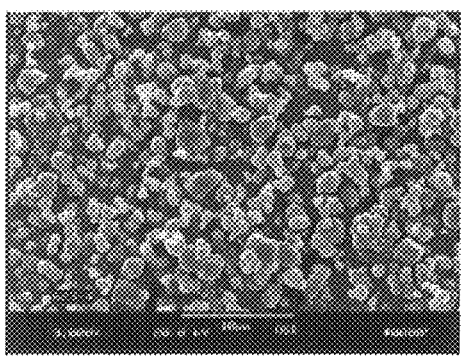
Fig. 6
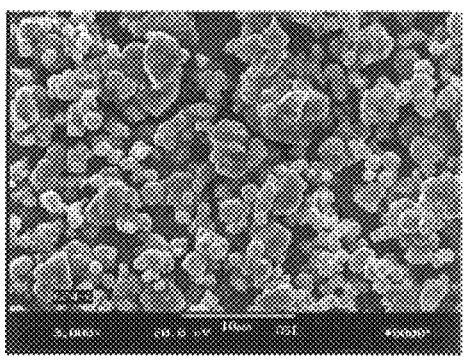

METHOD OF MAKING A BORATE PHOSPHOR HAVING A DISCRETE PARTICLE MORPHOLOGY

CROSS-REFERENCES TO RELATED APPLICATIONS

This application claims the benefit of U.S. Provisional Application 60/198,707, filed Apr. 20, 2000.

TECHNICAL FIELD

This invention relates to borate phosphors and methods of making borate phosphors. In particular, this invention relates to flux materials for making yttrium gadolinium borate phosphors.

BACKGROUND ART

The phosphor hosts $YBO_3$ and $GdBO_3$ have been known for a long time. For example, Avella et al. described in 1967 the luminescence of these materials activated with terbium or europium under cathode ray excitation. *J. Electrochem. Soc.* 114 (1967) 613. Yet, until recently, these materials have seen little commercial use because less expensive and/or more efficient phosphors were available for general lighting and cathode ray applications.

With the advent of plasma display panel (PDP) technology, there has been a renewed interest in these phosphors, especially the red-emitting europium-activated phosphors. The reason for the renewed interest derives from the ability of these materials to convert xenon plasma radiation (about 147 nm to about 172 nm) into visible light better than most other PDP phosphor candidates. In fact, europium-activated solid solutions of $YBO_3$ and $GdBO_3$ are the phosphors of choice for PDP flat panel display technology.

The conventional method of synthesis for these materials as described by Avella et al. is less than desirable for PDP applications. The phosphor produced by the conventional method is highly agglomerated which makes it difficult for PDP panel manufacturers to apply smooth, uniform phosphor coatings. Furthermore, conventional deaggomeration methods such as milling are undesirable since they tend to reduce the brightness of the phosphor. Thus, it would be an advantage to provide a phosphor having a discrete particle morphology which does not require deagglomeration.

SUMMARY OF THE INVENTION

It is an object of the invention to obviate the disadvantages of the prior art.

It is another object of the invention to provide a method of making a borate phosphor having a discrete particle morphology without deagglomeration.

In accordance with one object the invention, there is provided a method of making a borate phosphor having a discrete particle morphology. The phosphor has the general formula:

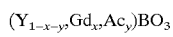

where Ac is a trivalent rare earth element;
x is from 0 to 1-y;
y is from greater than 0 to about 0.2;
The method comprises forming a mixture of yttrium oxide, gadolinium oxide, an oxide of the rare earth element, boric acid and a flux, the flux comprising a salt of barium, sodium, potassium, or a combination thereof; and firing the mixture at a temperature and for a time sufficient to form the phosphor.

BRIEF DESCRIPTION OF THE DRAWINGS

FIG. 1 is a scanning electron microscopy (SEM) photomicrograph of a borate phosphor prepared by a prior art method.

FIGS. 2–18 are SEM photomicrographs of phosphors having the same composition as the phosphor in FIG. 1 and prepared by the method of this invention.

DESCRIPTION OF THE PREFERRED EMBODIMENTS

Figure 7:
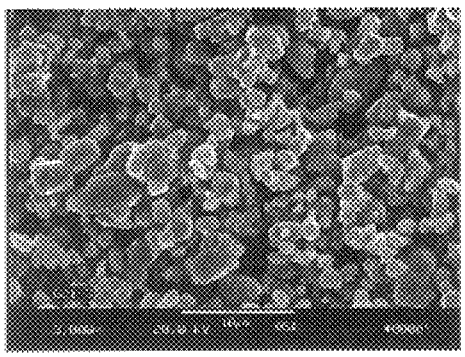

For a better understanding of the present invention, together with other and further objects, advantages and capabilities thereof, reference is made to the following disclosure and appended claims taken in conjunction with the above-described drawings.

A method for directly synthesizing borate phosphors having a discrete particle morphology has been invented. These borate phosphors may be represented by the general formula:

where Ac is a trivalent rare earth element;
x is from 0 to 1-y;
y is from greater than 0 to about 0.2.
Preferably, the borate phosphors have the general formula:

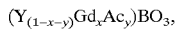

where Ac is either Eu or Tb;
x is from 0 to 1-y;
and y is from about 0.01 to about 0.10.

The discrete particle morphology results from the use of a flux which is comprised of a salt of barium, sodium, potassium, or a combination thereof. Preferred salts include halides, nitrates or carbonates. The flux is added to a stoichiometric mixture of yttrium oxide, gadolinium oxide, an oxide of the rare earth element activator, and boric acid. Preferably, an excess of about 10 mole percent boric acid is present in the mixture. The total amount of the salt flux preferably comprises from about 0.1% to about 100% of the weight of the oxides in the phosphor formulation. The residual amount of the metal cations from the fluxes is less than about 500 ppm in the resulting phosphors. The phosphors made by this method have a discrete particle morphology, i.e., comprise primarily nonagglomerated single crystallites. This allows the phosphors to be used directly by PDP panel manufacturers without an additional deagglomeration step which can reduce brightness.

The following non-limiting examples are presented. The weight percentages of the fluxes are given as the percentage of the weight of the mixed oxide component, .

EXAMPLE 1

Control

The control phosphor was prepared by a conventional synthesis method. Twenty grams of a mixed oxide of the composition $(Y_{0.730}Gd_{0.218}Eu_{0.052})_2O_3$ was compounded with 10.4 grams of $H_3BO_3$ and first step fired at 500° C. in air for about 5 hours. This composition contains about a 10 mole % excess of $H_3BO_3$. The fired cake was then cooled and lightly ground to pass a 100-mesh sieve and then fired at 925° C. for about 5 hours. The resulting cake was cooled and washed using a magnetic stirrer and about 3 liters of hot deionized (DI) water. The washed material was then passed through a 25 micron screen and dried. An SEM photomicrograph of the finished phosphor is shown as FIG. 1. The phosphor particles produced by the conventional method are highly agglomerated. While these agglomerates maybe be reduced to single crystallites, it would be necessary to subject the phosphor to further processing, such as milling.

Barium Salt Fluxes

EXAMPLE 2

0.26 wt. % $BaCl_2.2H_2O$

A 0.052 gram amount of $BaCl_2.2H_2O$ was compounded with the components of Example 1 and processed under the same conditions. An SEM photomicrograph of the finished phosphor is shown as FIG. 2. The phosphor exhibits a discrete particle morphology as compared to Example 1.

EXAMPLE 3

2.6 wt. % $BaCl_2.2H_2O$

A 0.520 gram amount of $BaCl_2.2H_2O$ was added to the components of Example 1 and processed under the same conditions. An SEM photomicrograph of the finished phosphor is shown as FIG. 3. Again, the phosphor exhibits a discrete particle morphology as compared to Example 1.

EXAMPLE 4

10.4 wt. % $BaCl_2.2H_2O$

A 2.08 gram amount of $BaCl_2.2H_2O$ was added to the components of Example 1 and processed under the same conditions. An SEM photomicrograph of the finished phosphor is shown as FIG. 4. Again, the phosphor exhibits a discrete particle morphology as compared to Example 1.

EXAMPLE 5

26 wt. % $BaCl_2.2H_2O$

A 5.2 gram amount of $BaCl_2.2H_2O$ was added to the components of Example 1 and processed under the same conditions, except the second firing temperature was 1050° C. An SEM photomicrograph of the finished phosphor is shown as FIG. 5. Again, the phosphor exhibits a discrete particle morphology as compared to Example 1.

EXAMPLE 6

104 wt % $BaCl_2.2H_2O$

A 20.8 gram amount of $BaCl_2.2H_2O$ was added to the components of Example 1 and processed under the same conditions, except the second firing temperature was 1050° C. An SEM photomicrograph of the finished phosphor is shown as FIG. 6. Again, the phosphor exhibits a discrete particle morphology as compared to Example 1.

The above examples demonstrate that there is no apparent upper limit on the amount of flux that can be used to produce the discrete particle morphology. Therefore, the flux amount can be selected based on practical manufacturing considerations.

EXAMPLE 7

8 wt. % $BaBr_2.2H_2O$

A 1.60 gram amount of $BaBr_2.2H_2O$ was added to the components of Example 1 and processed under the same conditions, except the second firing temperature was 950° C. An SEM photomicrograph of the finished phosphor is shown as FIG. 7. As with Examples 2–6, the phosphor exhibited a discrete particle morphology.

EXAMPLE 8

8 wt. % $Ba(NO_3)_2$

Figure 8:
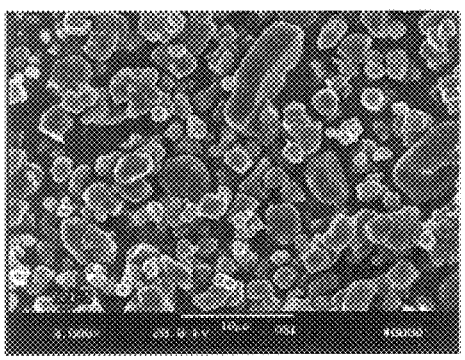

A 1.60 gram amount of $Ba(NO_3)_2$ was added to the components of Example 1 and processed under the same conditions, except the second firing temperature was 950° C. An SEM photomicrograph of the finished phosphor is shown as FIG. 8. As with Examples 2–7, the phosphor exhibits a discrete particle morphology as compared to Example 1.

EXAMPLE 9

8 wt. % $BaCO_3$

Figure 9:
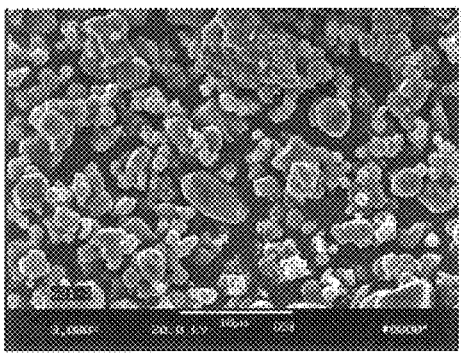
Figure 12:
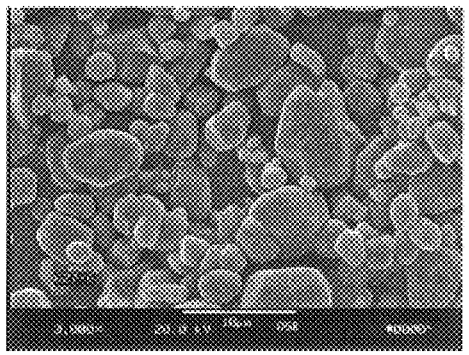

A 1.60 gram amount of $BaCO_3$ was added to the components of Example 1 and processed under the same conditions, except the second firing temperature was 950° C. An SEM photomicrograph of the finished phosphor is shown as FIG. 9. As with the use of the other barium salts, the phosphor exhibits a discrete particle morphology as compared to Example 1.

Sodium Salt Fluxes

EXAMPLE 10

8 wt. % NaCl

Figure 10:
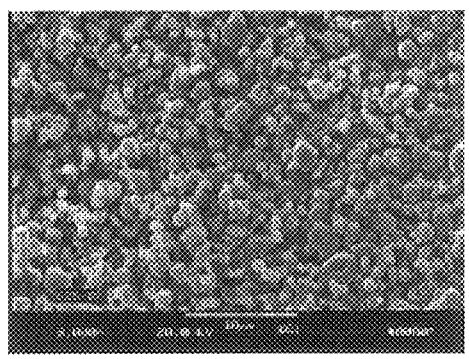

A 1.60 gram amount of NaCl was added to the components of Example 1 and processed under the same conditions, except the second firing temperature was 875° C. An SEM photomicrograph of the finished phosphor is shown as FIG. 10. As can be seen from the SEM photomicrograph, the phosphor exhibits a discrete particle morphology as compared to Example 1.

EXAMPLE 11

8 wt. % NaBr

Figure 11:
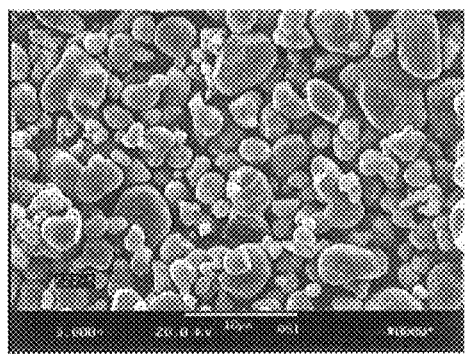

A 1.60 gram amount of NaBr was added to the components of Example 1 and processed under the same conditions, except the second firing temperature was 925° C. An SEM photomicrograph of the finished phosphor is shown as FIG. 11. Again, there is a discrete particle morphology as compared to Example 1.

EXAMPLE 12

8 wt. % NaI

A 1.60 gram amount of NaI was added to the components of Example 1 and processed under the same conditions, except the second firing temperature was 925° C. An SEM photomicrograph of the finished phosphor is shown as FIG.

12. Again, there is a discrete particle morphology as compared to Example 1.

Potassium Salt Fluxes

EXAMPLE 13

8 wt. % KCl

Figure 13:
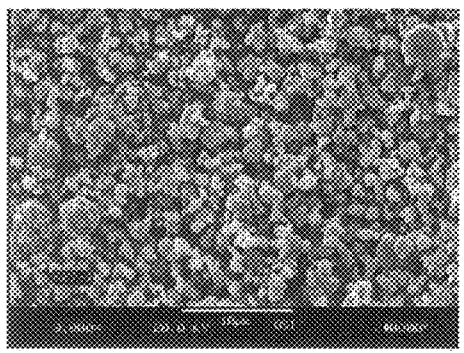

A 1.60 gram amount of KCl was added to the components of Example 1 and processed under the same conditions, except the second firing temperature was 925° C. An SEM photomicrograph of the finished phosphor is shown as FIG. 13. Again there is a discrete particle morphology as compared to Example 1.

EXAMPLE 14

8 wt. % KBr

Figure 14:
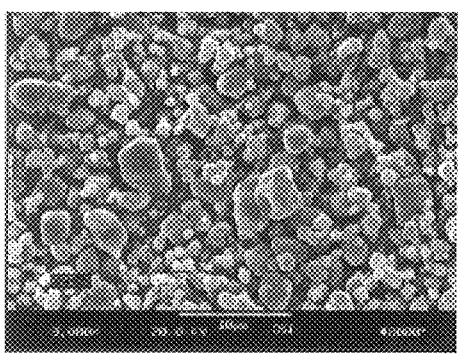

A 1.60 gram amount of KBr was added to the components of Example 1 and processed under the same conditions, except the second firing temperature was 925° C. An SEM photomicrograph of the finished phosphor is shown as FIG. 14. Again there is a discrete particle morphology as compared to Example 1.

EXAMPLE 15

8 wt. % KI

Figure 15:
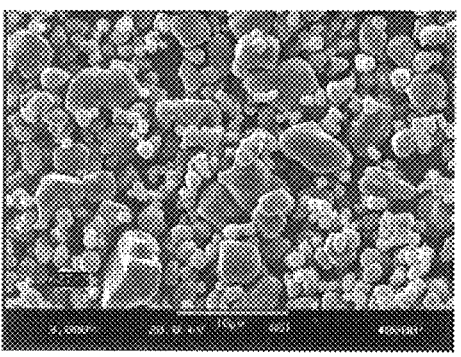

A 1.60 gram amount of KI was added to the components of Example 1 and processed under the same conditions, except the second firing temperature was 925° C. An SEM photomicrograph of the finished phosphor is shown as FIG. 15. Again there is a discrete particle morphology as compared to Example 1.

Combinations of Salts

EXAMPLE 16

1.5 wt. % NaCl and 1.5 wt. % $BaCl_2.2H_2O$

Figure 16:
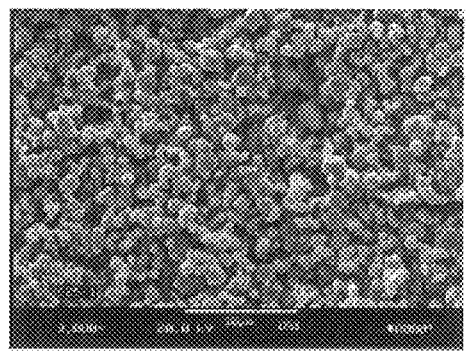

A 0.31 gram amount of NaCl and a 0.31 gram amount of $BaCl_2.2H_2O$ were added to the components of Example 1 and processed under the same conditions, except the second firing temperature was 875° C. An SEM photomicrograph of the finished phosphor is shown as FIG. 16. As with the single component fluxes, there is a discrete particle morphology as compared to Example 1.

EXAMPLE 17

14 wt. % NaCl and 14 wt. % $BaCl_2.2H_2O$

Figure 17:
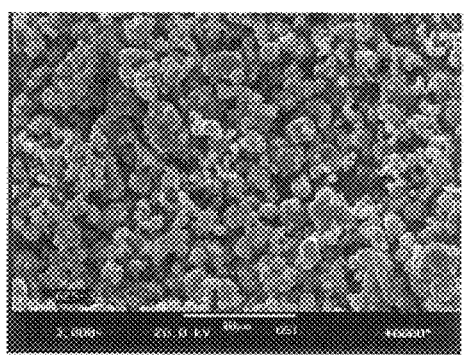

A 2.81 gram amount of NaCl and a 2.81 gram amount of $BaCl_2.2H_2O$ were added to the components of Example 1 and processed under the same conditions, except the second firing temperature was 875° C. An SEM photomicrograph of the finished phosphor is shown as FIG. 17. Again, there is a discrete particle morphology as compared to Example 1.

EXAMPLE 18

5.2 wt. % KCl and 5.2 wt. % $BaCl_2.2H_2O$

Figure 18:
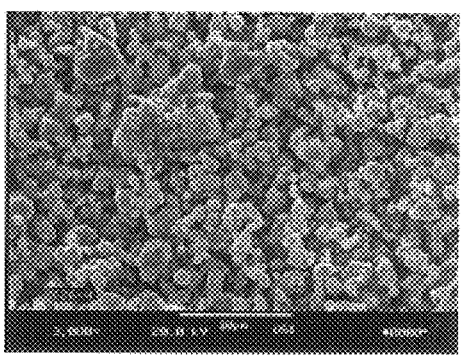

A 1.04 gram amount of KCl and a 1.04 gram amount of $BaCl_2.2H_2O$ were added to the components of Example 1 and processed under the same conditions, except the second firing temperature was 900° C. An SEM photomicrograph of the finished phosphor is shown as FIG. 18. Again, there is a discrete particle morphology as compared to Example 1.

Other Alkaline Metal Salt Fluxes

EXAMPLE 19

5.2 wt % $MgCl_2$

Figure 19:
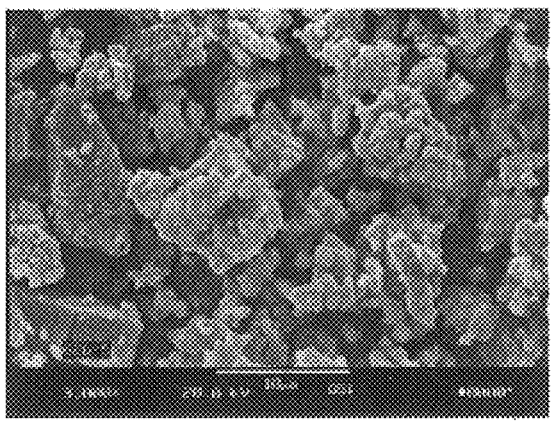
FIGS. 19–21 are SEM photomicrographs of phosphors having the same composition as the phosphor in FIG. 1 and prepared with alkaline metal salt fluxes which do not promote the formation of discrete particles.

A 1.04 gram amount of $MgCl_2$ was added to the components of Example 1 and processed under the same conditions, except the second firing temperature was 900° C. An SEM photomicrograph of the finished phosphor is shown as FIG. 19. Unlike the other phosphors made with Ba, Na and K salt fluxes, this phosphor does not show an improvement in particle discreteness as compared to Example 1.

EXAMPLE 20

8 wt. % $SrCl_2$

Figure 20:
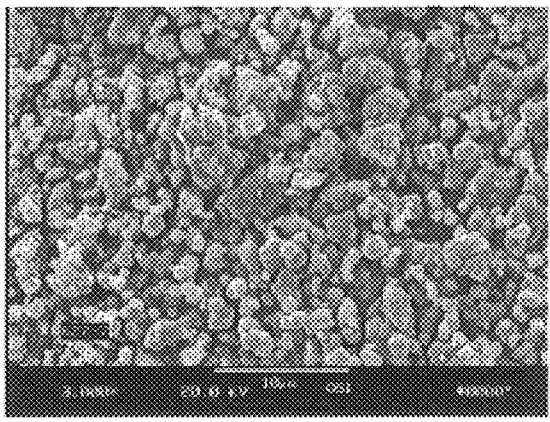

A 1.60 gram amount of $SrCl_2$ was added to the components of Example 1 and processed under the same conditions, except the second firing temperature was 925° C. An SEM photomicrograph of the finished phosphor is shown as FIG. 20. Again, this phosphor does not show an improvement in particle discreteness as compared to Example 1.

EXAMPLE 21

8 wt. % $CaCl_2$

Figure 21:
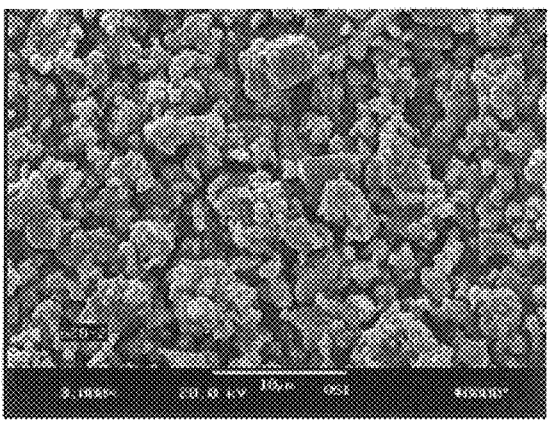

A 1.60 gram amount of $CaCl_2$ was added to the components of Example 1 and processed under the same conditions, except the second firing temperature was 950° C. An SEM photomicrograph of the finished phosphor is shown as FIG. 21. Again, this phosphor does not show an improvement in particle discreteness as compared to Example 1.

While there has been shown and described what are at the present considered the preferred embodiments of the invention, it will be obvious to those skilled in the art that various changes and modifications may be made therein without departing from the scope of the invention as defined by the appended claims.

I claim:

1. A method of making a borate phosphor having a discrete particle morphology, the phosphor having the general formula:

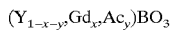

$(Y_{1-x-y}Gd_xAc_y)BO_3$ where Ac is a trivalent rare earth element;

x is from 0 to 1−y;

y is from greater than 0 to about 0.2;

the method comprising forming a mixture of yttrium oxide, gadolinium oxide, an oxide of the rare earth element, boric acid and a flux, the flux comprising a carbonate or nitrate of barium, sodium, potassium, or a combination thereof and firing the mixture at a temperature and for a time sufficient to form the phosphor.

2. The method of claim 1 wherein the amount of the flux is from 0.1% to 100% of the weight of the oxides.

3. A method of making a borate phosphor having a discrete particle morphology, the phosphor having the general formula:

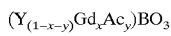

$(Y_{(1-x-y)}Gd_xAc_y)BO_3$ where Ac is either Eu or Tb;

x is from 0 to 1−y;

and y is from about 0.01 to about 0.10;

the method comprising forming a mixture of yttrium oxide, gadolinium oxide, europium oxide or terbium oxide, boric acid and a flux, the flux comprising a salt of barium, sodium, potassium, or a combination thereof; and firing the mixture at a temperature and for a time sufficient to form the phosphor.

4. The method of claim 3 wherein the flux comprises a halide of barium, sodium, potassium, or a combination thereof.

5. The method of claim 3 wherein the flux is a carbonate or nitrate of barium, sodium or potassium.

6. The method of claim 3 wherein the amount of the flux is from 0.1% to 100% of the weight of the oxides.

7. The method of claim 3 wherein the flux is $BaCl_2.2H_2O$.

8. The method of claim 3 wherein the flux is $BaBr_2.2H_2O$.

9. The method of claim 3 wherein the flux is $BaCO_3$.

10. The method of claim 3 wherein the flux is $Ba(NO_3)_2$.

11. The method of claim 3 wherein the flux is NaCl.

12. The method of claim 3 wherein the flux is NaBr.

13. The method of claim 3 wherein the flux is NaI.

14. The method of claim 3 wherein the flux is KCl.

15. The method of claim 3 wherein the flux is KBr.

16. The method of claim 3 wherein the flux is KI.

17. The method of claim 3 wherein the flux is a combination of NaCl and $BaCl_2.2H_2O$.

18. The method of claim 3 wherein the flux is a combination of KCl and $BaCl_2.2H_2O$.

* * * * *